US009253478B2

United States Patent
Morita et al.

(10) Patent No.: US 9,253,478 B2
(45) Date of Patent: Feb. 2, 2016

(54) INFORMATION PROCESSING METHOD AND INFORMATION PROCESSING DEVICE

(75) Inventors: Akiyoshi Morita, Kanagawa (JP); Yasuo Takahashi, Tokyo (JP); Hideyuki Agata, Tokyo (JP); Akitoshi Yamaguchi, Saitama (JP); Takeshi Makishima, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 877 days.

(21) Appl. No.: 13/544,016

(22) Filed: Jul. 9, 2012

(65) Prior Publication Data

US 2013/0038705 A1  Feb. 14, 2013

(30) Foreign Application Priority Data

Aug. 11, 2011 (JP) ................................. 2011-175707

(51) Int. Cl.
*H04N 13/04* (2006.01)

(52) U.S. Cl.
CPC ....... *H04N 13/0438* (2013.01); *H04N 13/0445* (2013.01); *H04N 13/0497* (2013.01); *H04N 2013/0461* (2013.01)

(58) Field of Classification Search
None
See application file for complete search history.

(56) References Cited

U.S. PATENT DOCUMENTS

| 8,331,719 B2 * | 12/2012 | Bae .............................. 382/266 |
| 2011/0050864 A1 * | 3/2011 | Bond ............................. 348/51 |
| 2011/0221932 A1 * | 9/2011 | Ahn et al. ..................... 348/234 |
| 2011/0249958 A1 * | 10/2011 | Fujita et al. .................. 386/280 |
| 2012/0057005 A1 * | 3/2012 | Shibahara ...................... 348/56 |

FOREIGN PATENT DOCUMENTS

JP  2011-19917  2/2011

* cited by examiner

*Primary Examiner* — Sath V Perungavoor
*Assistant Examiner* — Janese Duley
(74) *Attorney, Agent, or Firm* — Katten Muchin Rosenman LLP

(57) ABSTRACT

A video-image selection unit cyclically acquires at least two types of video images. A replacing mask determination unit selects, for each acquired video image, a mask pattern for masking a video image acquired by the video-image selection unit by replacing some pixels composing the video image with pixels of a single color such that said some pixels are spatially removed. Based on the mask pattern, the video-image replacing unit replaces said some pixels composing the video image with the pixels of a single color. A video-image output unit outputs the video image for which the replacement was performed. When selecting a mask pattern, the replacing mask determination unit selects a mask pattern that is different from a mask pattern used for the last video image, the mask pattern being different in the position of pixels not to be replaced with pixels of a single color.

7 Claims, 13 Drawing Sheets

FIG.2
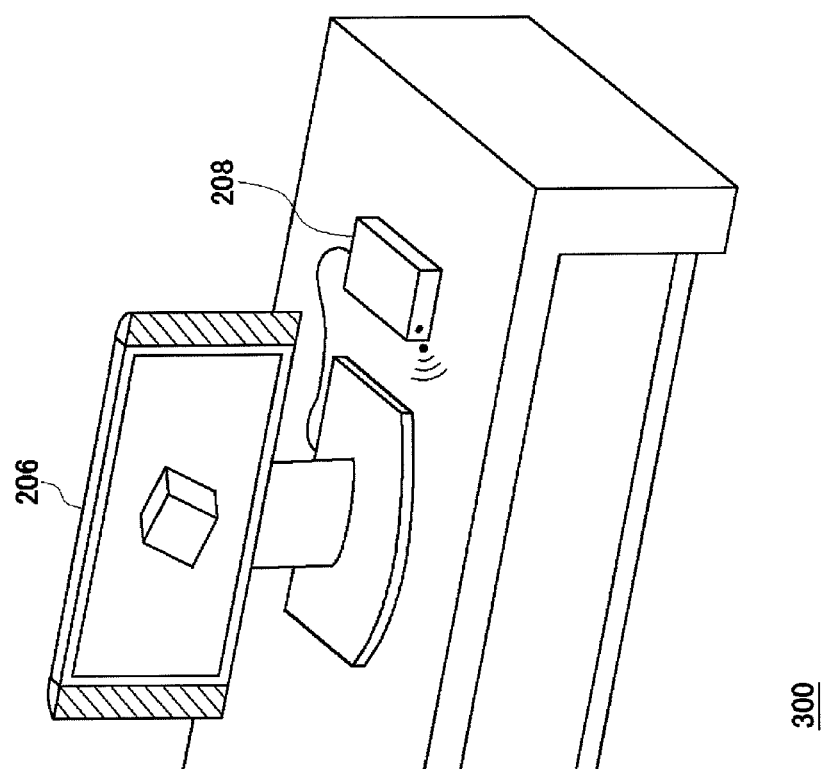
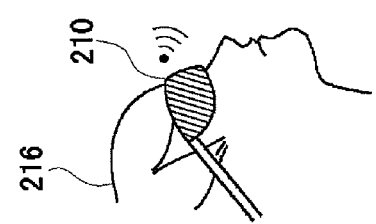

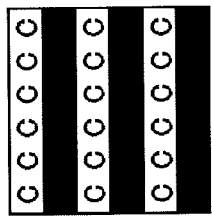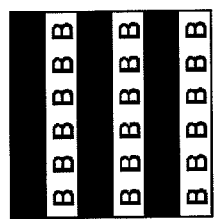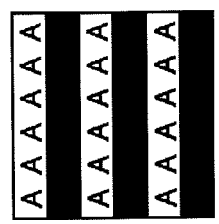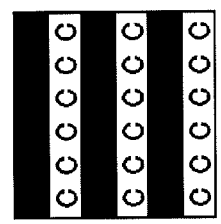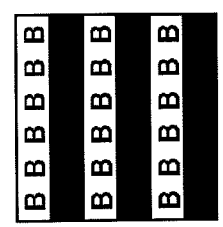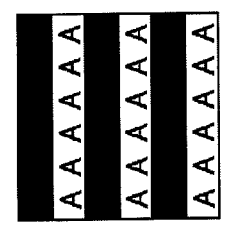
FIG.12A
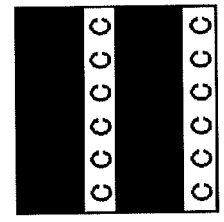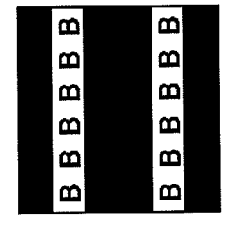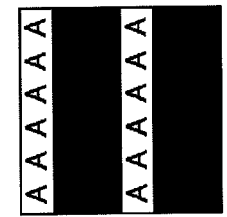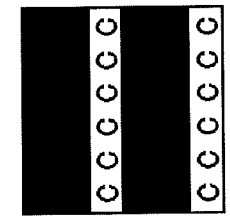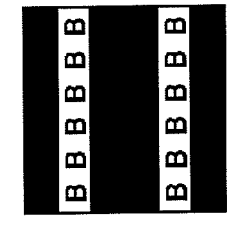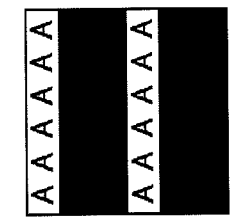
FIG.12B

INFORMATION PROCESSING METHOD AND INFORMATION PROCESSING DEVICE

BACKGROUND OF THE INVENTION

1. Field of the Invention

The present inventions relates to an information processing method and an information processing device.

2. Description of the Related Art

Recently, the performance of consumer television is improving and three-dimensional television sets capable of presenting three-dimensional stereoscopic video images with depth are becoming available to the public. Television sets have been also suggested that allow for different video images to be viewed at the same time by multiple people sharing a single television set (see patent document No. 1).

[patent document No. 1] Japanese Laid-Open Publication No. 2011-19917

There are various technologies for presenting stereoscopic video images and technologies for sharing a single screen with multiple people. There are also various methods used to implement display panels for presenting such video images. Depending on the way these video images are presented, a so-called "crosstalk" phenomenon where different video images are shown in layers may emerge, and the phenomenon can be a cause of providing viewers a feeling of discomfort.

SUMMARY OF THE INVENTION

In this background, a purpose of the present invention is to provide a technology for reducing crosstalk that can be produced in television.

One embodiment of the present invention relates to a video-image display method. The method comprises: making a video-image selection for cyclically acquiring at least two types of video images; making a mask determination for selecting, for each acquired video image, a mask pattern for masking the acquired video image by replacing some pixels composing the acquired video image with pixels of a single color such that said some pixels are spatially removed; and displaying on a display unit the video image after replacing said some pixels composing the video image with pixels of a single color based on the selected mask pattern. In the mask determination, when selecting a mask pattern for a certain video image, a mask pattern is selected that is different from a mask pattern used for the last video image, the mask pattern being different in the position of pixels not to be replaced with pixels of a single color.

Another embodiment of the present invention relates to a video-image reproduction device. The device comprises: a video-image selection unit configured to cyclically acquire at least two types of video images; a replacing mask determination unit configured to select, for each acquired video image, a mask pattern for masking the video image acquired by the video-image selection unit by replacing some pixels composing the acquired video image with pixels of a single color such that said some pixels are spatially removed; a video-image replacing unit configured to replace said some pixels composing the video image acquired by the video-image selection unit with the pixels of a single color based on the mask pattern selected by the replacing mask determination unit and to output the video image to an image buffer; and an output unit configured to output the video image for which the replacement was performed by the video-image replacing unit. The replacing mask determination unit selects, when selecting a mask pattern for a certain video image, a mask pattern that is different from a mask pattern used for the last video image, the mask pattern being different in the position of pixels not to be replaced with pixels of a single color.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 2 is a schematic view of a shutter-based three-dimensional video-image display system in which parallax images are used;

FIGS. 8A-8C are diagrams illustrating a group of format standards related to three-dimensional video images in HDMI v1.4a;

FIGS. 12A-12B are diagrams each showing an example of a mask pattern when displaying three video images while sharing television;

DETAILED DESCRIPTION OF THE INVENTION

The invention will now be described by reference to the preferred embodiments. This does not intend to limit the scope of the present invention, but to exemplify the invention.

[Three-Dimensional Video Images Utilizing Parallax Images]

Figure 1:
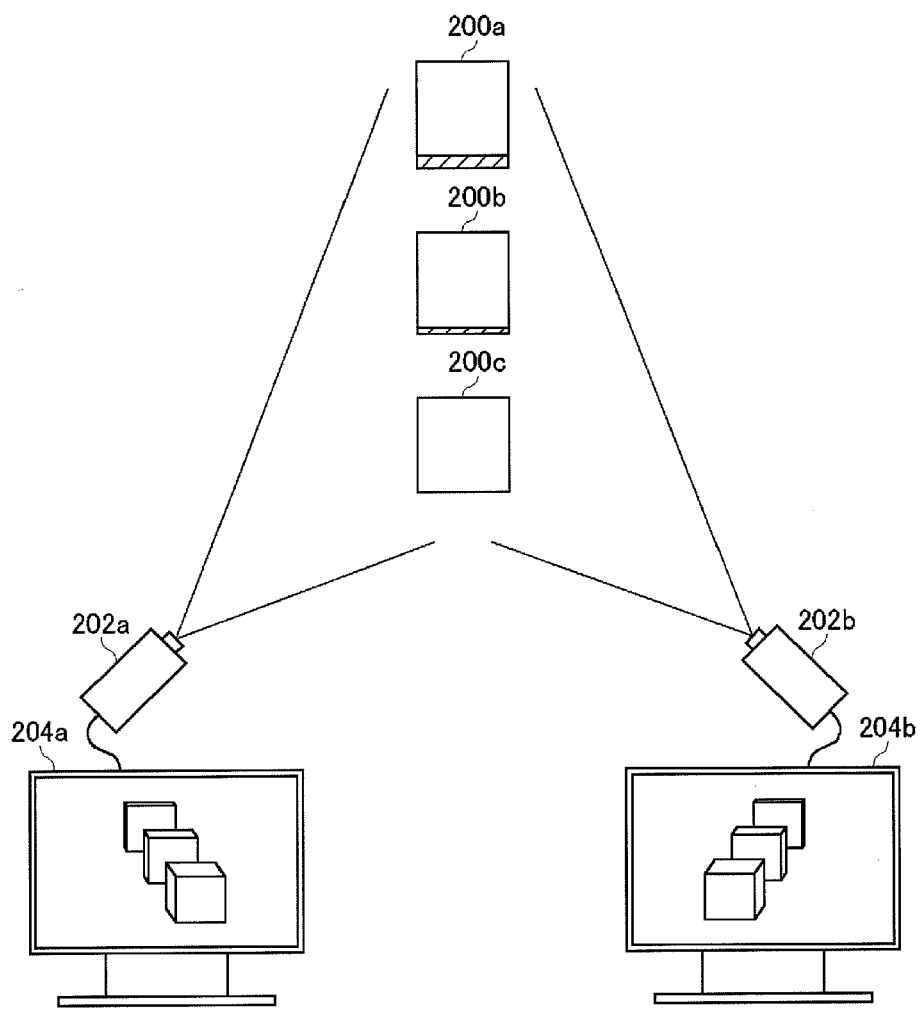
FIG. 1 is a diagram illustrating a relationship between an object and parallax images thereof in a three-dimension space.

FIG. 1 is a diagram illustrating a relationship between an object and parallax images thereof in a three-dimension space. In a three-dimensional space, an object 200a, an object 200b, and an object 200c, which will be generically referred to as objects 200, are imaged by a left-eye camera 202a adapted to image the objects 200 from left and a right-eye camera 202b adapted to image the objects 200 from right, which will be generically referred to as cameras 202. Referring to FIG. 1, a video image of the objects 200 captured by the left-eye camera 202a and a video image of the objects 200 captured by the right-eye camera 202b are displayed in a monitor 204a and a monitor 204b, respectively, which will be generically referred to as two-dimensional monitors 204.

The left-eye camera 202a and the right-eye camera 202b image the objects 200 from different positions. Therefore, the video image displayed on the monitor 204a and the video image displayed on the monitor 204b show the objects 200 oriented in different directions. As described, images of the objects 200 in a three-dimensional space as viewed from different viewpoints are referred to as "parallax images." Since human eyes are spaced apart by about 6 cm, parallax is produced between an image viewed by the left eye and an image viewed by the right eye. Human brain is said to use parallax images perceived by the left and right eyes as information for recognizing the depth of an object. For this reason, by projecting a parallax image perceived by the left eye and a parallax image perceived by the right eye to the respective eyes, a stereoscopic video image having a depth is perceived by a person. Hereinafter, a "stereoscopic image" and a "three-dimensional image" are used to convey the same meaning in the present specification. In this specification, a "video image" includes "image information" that is visually perceived and "audio information" that is aurally perceived.

Various methods are used to implement three-dimensional television for presenting an image with depth to people. As an example, a description will be given of television utilizing shutter glasses that alternately displays a parallax image for the left eye and a parallax image for the right eye in a time-divided manner. FIG. 2 is a schematic view of a shutter-based three-dimensional video-image display system 300 utilizing parallax images. The three-dimensional video-image display system 300 comprises a television 206 serving as a display unit for displaying parallax images, shutter glasses 210 used to view parallax images, and a glass driving signal origination unit 208 for synchronizing the television 206 and the shutter glasses 210.

The television 206 alternately presents a left-eye parallax image and a right-eye parallax image in a time-division manner. The glass driving signal origination unit 208 originates a control signal of an infrared ray or the like indicating the timing of displaying the parallax images in the television 206. The shutter glasses 210 are provided with a receiver (not shown) for receiving a control signal transmitted from the glass driving signal origination unit 208 and shutters the left or right lens in accordance with the received control signal. The shutter is implemented, for example, by using the known technology of liquid crystal shutters.

More specifically, when the television 206 displays a left-eye parallax image, the shutter glasses 210 receive a signal for closing the shutter of the right eye lens from the glass driving signal origination unit 208. The shutter glasses 210 shield an image entering the right eye by closing the shutter of the right eye lens in accordance with the received signal. This results in the left-eye parallax image being projected to only the left eye of the user when the television 206 displays the left-eye parallax image. Conversely, when the television 206 displays the right-eye parallax image, the right-eye parallax image is projected to only the right eye of the user by allowing the shutter glasses 210 to close the shutter of the left eye lens.

Figure 3:
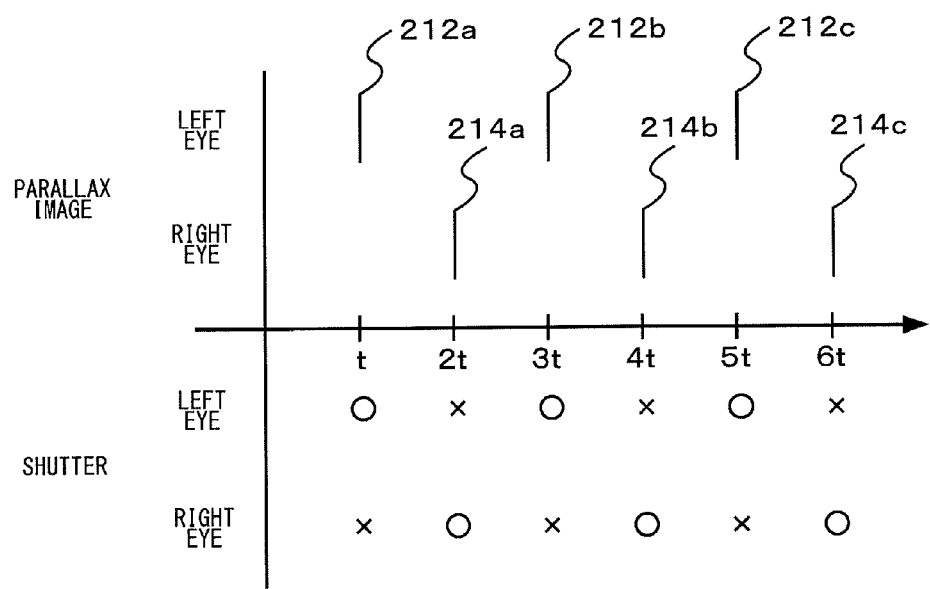
FIG. 3 is a diagram illustrating a relationship between the timing of driving a shutter of the shutter glasses and the timing of displaying parallax images in three-dimensional television.

FIG. 3 is a diagram illustrating a relationship between the timing of driving a shutter of the shutter glasses 210 and the timing of displaying parallax images in the television 206. A left-eye parallax image 212a, a left-eye parallax image 212b, and a left-eye parallax image 212c, which are generically referred to as left-eye parallax images 212, and a right-eye parallax image 214a, a right-eye parallax image 214b, and a right-eye parallax image 214c, which are generically referred to as right-eye parallax images 214, are alternately displayed at a predetermined interval t (e.g., 1/120 sec).

When the left-eye parallax image 212a is being displayed, the left-eye shutter of the shutter glasses 210 is open and the right-eye shutter is closed. Referring to FIG. 3, the open state of the shutter of the shutter glasses 210 is indicated by "o" and the closed state is indicated by "x". As shown in FIG. 3, stereoscopic video images with depth can be presented to the user by synchronizing the display of parallax images in the television 206 and the shutter opening/closing of the shutter glasses 210 such that the left-eye parallax images 212 are projected to the user's left eye and the right-eye parallax images 214 are projected to the right eye.

[Screen Sharing Utilizing Shutter Glasses]

Figure 4:
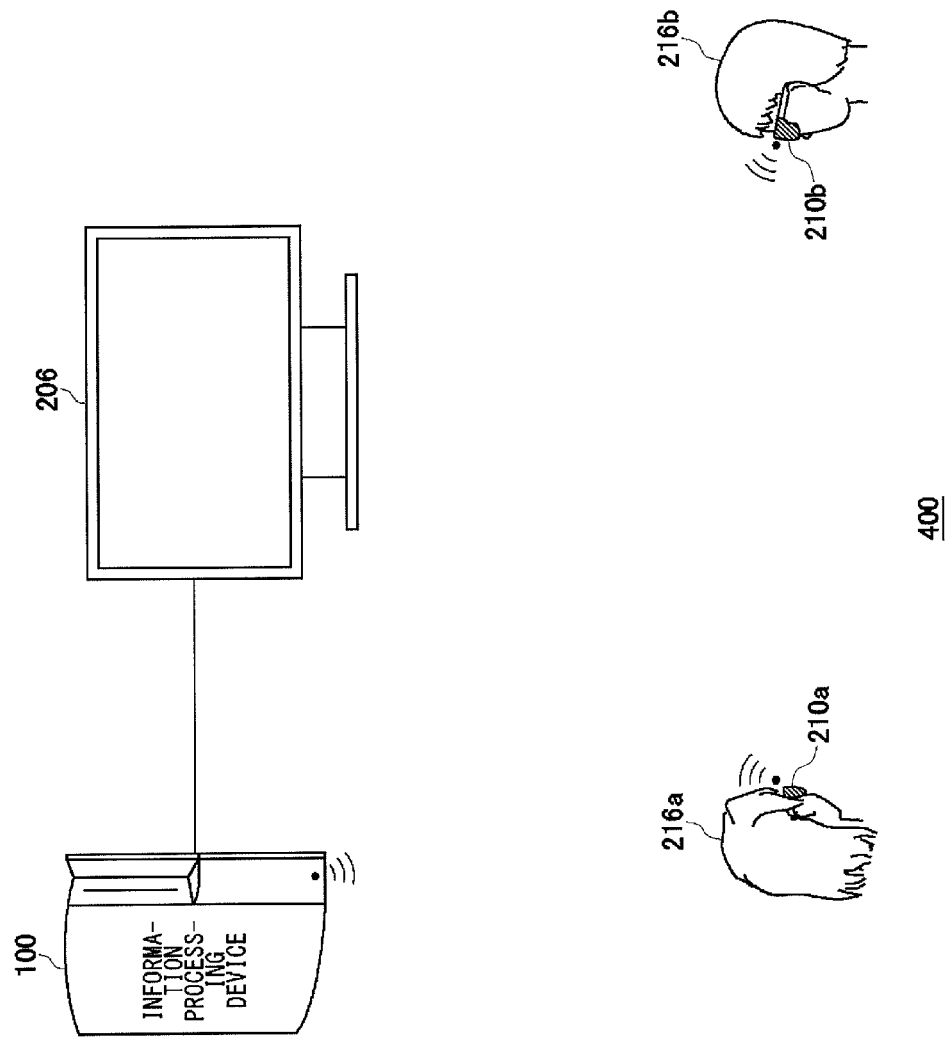
FIG. 4 is a schematic view of a screen sharing system in which shutter glasses are used.

FIG. 4 is a schematic view of a screen sharing system 400 in which the shutter glasses 210 are used. The screen sharing system 400 comprises the television 206 and the shutter glasses 210, just like the three-dimensional video-image display system 300, and further comprises an information processing device 100. The information processing device 100 includes the above-stated functions of the glass driving signal origination unit 208. A detailed description will follow.

A user 216a and a user 216b referred to as users 216 view the television 206 while each wearing shutter glasses 210. The shutter glasses 201 worn by the user 216a are referred to as shutter glasses 210a, and the shutter glasses 201 worn by the user 216b are referred to as shutter glasses 210b. The information processing device 100 alternately transmits a video image viewed by the user 216a and a video image viewed by the user 216b in a time-division manner and originates a control signal indicating which video image is being transmitted.

The shutter glasses 210a determine the type of a video image being displayed on the television 206 based on the received control signal and open the left-eye and right-eye shutters of the shutter glasses 210a at the timing of displaying the video image viewed by the user 216a. The shutter glasses 210a determine the type of a video image being displayed on the television 206 based on the received control signal and close the left-eye and right-eye shutters of the shutter glasses 210a when the video image viewed by the user 216a is not being displayed.

Just like the case of the shutter glasses 210a, the shutter glasses 210b determine the type of a video image being displayed on the television 206 based on the received control signal and open the left-eye and right-eye shutters of the shutter glasses 210b at the time of displaying the video image viewed by the user 216b. The shutter glasses 210b determine the type of a video image being displayed on the television 206 based on the received control signal and close the left-eye and right-eye shutters of the shutter glasses 210b when the video image viewed by the user 216b is not being displayed. As described, when the screen of the television 206 is shared by a plurality of users using the shutter glasses 210, the shutter glasses 210 open the shutter of the shutter glasses 210 when any one of the video images is being displayed on the television 206 that serves as a display unit.

Although not shown in the figure, an earphone is provided to the shutter glasses 210 according to the embodiment as an audio output unit, allowing for reproduction of audio information corresponding to a video image viewed by each user 216 wearing the shutter glasses 210.

[Television Display Method]

There are various methods for implementing a display panel of the television 206 such as a PDP (Plasma Display Panel) method that utilizes plasma, an LCD (Liquid Crystal Display) method that utilizes liquid crystals, and a micropol method that is one of LCD methods. In the present embodiment, an explanation is given on the premise that the display panel of the television 206 is a panel of an LCD method.

A description is given regarding the operating principle of the LCD method. The LCD method is achieved using molecules called liquid crystals that change their orientation when voltage is applied thereto. In the LCD method, the orientation of liquid crystal molecules are controlled by changing voltage applied to the liquid crystal molecules such that the permeation amount of backlights is controlled so as to display an image.

In a display panel of the LCD method, the display of a video image is generally updated while performing scanning on a line-by-line basis. For example, when displaying a three-dimensional video image, the state of pixels is updated, starting from the top line of a display panel 2, while performing scanning in the vertical direction down to the bottom line of the display panel. Therefore, when alternately updating left and right parallax images one by one, the left and right parallax images will be mixed in the middle of the update. Since it takes time for liquid crystals to respond, a time lag is caused until the pixels are actually updated after a signal for updating the pixels is received.

In viewing a three-dimensional video image in the television 206, the user 216 cannot view the left-eye image correctly with the left eye if the left and right parallax images are being mixed when the left-eye shutter of the shutter glasses 210 is opened. The same applies to the right eye. In sharing the display screen of the television 206 among a plurality of users 216, if a video image to be viewed by another user is mixed with a video image to be viewed by a certain user 216, the user 216 cannot view the correct video image, and a feeling of discomfort can possibly be provided.

[Crosstalk in LCD Method]

As described, a phenomenon where a video image to be originally displayed on the television 206 is displayed being mixed with another video image is called "crosstalk." It is said that crosstalk is likely to be caused when a stereoscopic video image is displayed on a display panel of an LCD method or when a screen is shared.

As described previously, in the LCD method, the orientation of liquid crystal molecules are controlled by changing voltage applied to the liquid crystal molecules so as to control the permeation amount of backlights. The liquid crystal molecules are relatively large, and it requires some time to move the liquid crystal molecules. Therefore, the response time required for the liquid crystal molecules to move to have a desired orientation after a predetermined voltage is applied to the liquid crystal molecules is said to be about 4-10 milliseconds.

There is also a technique called "overdrive" that improves response speed by increasing voltage applied to liquid crystals. However, overdrive cannot be used when returning the orientation of the liquid crystal molecules, which is obtained when voltage is being applied, back to the orientation obtained when the voltage is off. Thus, improving the response speed is a difficult challenge in the LCD method.

In displaying a three-dimensional video image in the television 206 of the LCD method that utilizes shutter glasses or in sharing a screen, different video images are displayed in a time-division manner. Therefore, liquid crystal molecules cannot catch up with responding to the switching of the video images, and an image that is not to be displayed originally might get in.

[Information Processing Device According to Embodiment]

The information processing device 100 according to the embodiment reduces crosstalk that can be produced when displaying different video images in a time-division manner in the television 206 of the LCD method that utilizes shutter glasses. An outline thereof is as follows: for pixels composing a video image, the video image is displayed at one moment, and pixels of a single color, such as gray pixels, are displayed at the subsequent moment. The video image is then displayed again at the subsequent moment. As described, the video image is displayed while periodically changing a pixel of the video image with a pixel of a single color. By changing a phase of this change cycle by each pixel composing the video image, the video image masked by thinning out pixels followed by replacement with pixels of a single color is displayed while periodically changing the position of a pixel displaying the video image. In other words, crosstalk is reduced in a black insertion method on a pixel-by-pixel basis while thinning out the video image. It is assumed that gray pixels include black pixels having a brightness value of 0.

Figure 5:
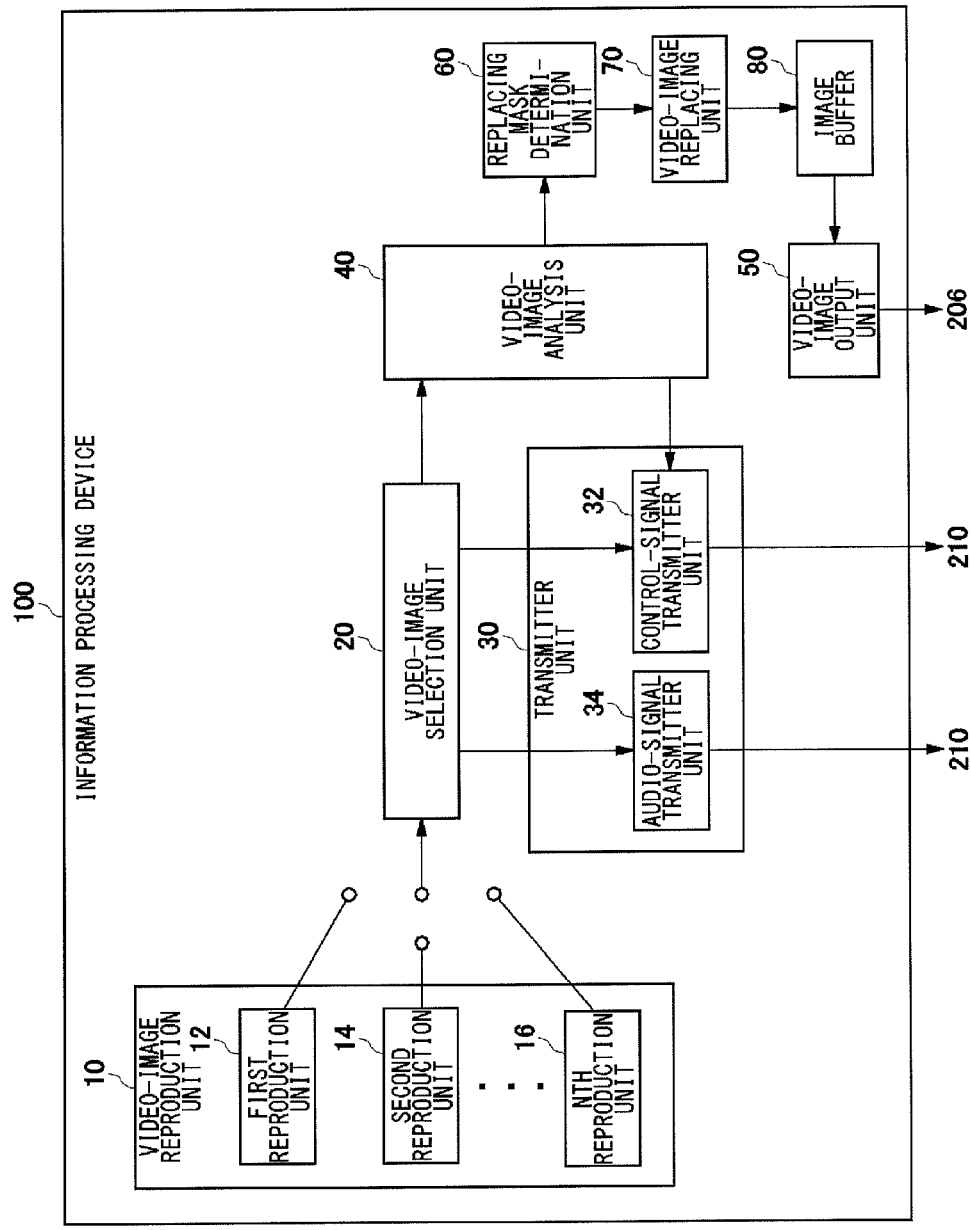
FIG. 5 is a diagram schematically illustrating the functional configuration of an information processing device according to the embodiment.

FIG. 5 is a diagram schematically illustrating the functional configuration of the information processing device 100 according to the embodiment. The information processing device 100 comprises a video-image reproduction unit 10, a video-image selection unit 20, a transmitter unit 30, a video-image analysis unit 40, a video-image output unit 50, a replacing mask determination unit 60, a video-image replacing unit 70, and an image buffer 80.

The video-image reproduction unit 10 reproduces a plurality of video images. Therefore, the video-image reproduction unit 10 further comprises a first reproduction unit 12, a second reproduction unit 14, and an Nth reproduction unit 16. N is an integer of at least 2 and represents the maximum number of video images that can be simultaneously reproduced. A specific value of N may be determined through experiments in consideration of the processing ability, manufacturing costs, power consumption, etc., of the information processing device 100. Examples of the reproduction units in the video-image reproduction unit 10 include a CPU (Central Processing Unit) for running games, a decoder for decoding encoded data such as an MPEG4 (Moving Picture Experts Group 4), a decoder of land-based digital television, and the like.

The video-image selection unit 20 cyclically acquires a video image output by the video-image reproduction unit 10. If the video image output by the video-image reproduction unit 10 is a stereoscopic video image including a left-eye parallax image and a right-eye parallax image, the video-image selection unit 20 acquires the left-eye parallax image and the right-eye parallax image as different video images. If the video image output by the video-image reproduction unit 10 includes audio information, the video-image selection unit 20 acquires the audio information. The video-image selection unit 20 acquires the audio information not cyclically but continuously. As shown in FIG. 4, the users 216 each individually possess an earphone for reproducing the audio information while sharing the television 206. Thus, the users 216 can continuously listen to the audio information.

The video-image analysis unit 40 analyzes the type of the video image acquired by the video-image selection unit 20. More specifically, the video-image analysis unit 40 analyzes by which reproduction unit in the video-image reproduction unit 10 the video image acquired by the video-image selection unit 20 was generated. The video-image analysis unit 40 analyzes whether or not the video image acquired by the video-image selection unit 20 is a stereoscopic image including a left-eye parallax image and a right-eye parallax image. If the video image is the stereoscopic image, the video-image analysis unit 40 analyzes which parallax image, either the left-eye parallax image or the right-eye parallax image, the video image acquired by the video-image selection unit 20 is.

Based on a result of analysis performed by the video-image analysis unit 40, the replacing mask determination unit 60 selects, for each acquired video image, a mask pattern for masking a video image acquired by a video-image selection unit 20 by replacing some pixels composing the video image with pixels of a single color such that said some pixels are spatially removed. When selecting a mask pattern for a video image currently being acquired by the video-image selection unit 20, the replacing mask determination unit 60 selects a mask pattern that is different from a mask pattern used for the last video image acquired by the video-image selection unit 20, the mask pattern being different in the position of pixels not to be replaced with pixels of a single color. With this, a pixel that displays a video image at a certain moment become a pixel of a single color at a subsequent moment and then becomes a pixel that displays another video image at a further subsequent moment. For each pixel, by inserting a pixel of a single color between a certain video image and another video image, mixing of video images due to crosstalk can be reduced. Details of a mask pattern and a method of selecting the mask pattern will be described later.

Based on a mask pattern selected by the replacing mask determination unit 60, the video-image replacing unit 70 masks a video image acquired by the video-image selection unit 20 by replacing some pixels composing the video image with pixels of a single color. The video-image replacing unit 70 outputs the masked video image to the image buffer 80. The video-image output unit 50 outputs to the television 206 the video image for which the replacement was performed by the video-image replacing unit 70 and which is stored in the image buffer.

The transmitter unit 30 transmits a control signal, which is used to control the shutter opening/closing of shutter glasses 210 that are worn by a user 216 to view the television 206 serving as a display unit, to the shutter glasses 210. The transmitter unit 30 also transmits to the shutter glasses 210 the audio information of a video image acquired by the video-image selection unit 20. Therefore, the transmitter unit 30 comprises a control-signal transmitter unit 32 and an audio-signal transmitter unit 34.

The control-signal transmitter unit 32 acquires from the video-image selection unit 20 the timing at which the video-image selection unit 20 acquires a video image from the video-image reproduction unit 10. The control-signal transmitter unit 32 also acquires a result of analysis performed by the video-image analysis unit 40. Based on these sets of information, the control-signal transmitter unit 32 generates a control signal used to control the shutter opening/closing of shutter glasses 210 and transmits the control signal to the shutter glasses 210. More specifically, the control signal generated by the control-signal transmitter unit 32 is a timing signal for the shutter glasses 210 to open/close a shutter thereof in synchronization with the display of a video image by the television 206 that serves as the display unit.

Based on the control signal received from the control-signal transmitter unit 32, the shutter glasses 210 determine the type of a video image being displayed on the television 206. If the video image being displayed on the television 206 is a video image being viewed by the user 216 wearing the shutter glasses 210, the shutter glasses 210 open the shutter of the shutter glasses so that the user 216 can view the video image.

For example, if the video image being viewed by the user 216 is a stereoscopic video image including a left-eye parallax image and a right-eye parallax image, the shutter glasses 210 further determine whether the video image being displayed on the television 206 is the left-eye parallax image or the right-eye parallax image based on the control signal. When the video image being displayed on the television 206 is the left-eye parallax image, the shutter glasses 210 open a left-eye shutter and close a right-eye shutter of the shutter glasses 210. Similarly, when the video image being displayed on the television 206 is the right-eye parallax image, the shutter glasses 210 open the right-eye shutter and close the left-eye shutter.

If a video image acquired by the video-image selection unit 20 includes audio information, the audio-signal transmitter unit 34 transmits the audio information to the shutter glasses 210 worn by the user 216 viewing the video image. More specifically, the audio-signal transmitter unit 34 superimposes the audio information on a transmission signal having a frequency that is different for each pair of shutter glasses 210 and transmits the transmission signal superimposed with the audio information. The shutter glasses 210 receive audio information to be reproduced based on the frequency of the transmission signal and reproduces the audio information using earphones.

FIG. 5 illustrates a functional configuration for realizing the information processing device 100 according to the embodiment. Other configurations are omitted. In FIG. 5, the elements shown in functional blocks that indicate a variety of processes are implemented in hardware by any CPU, a main memory, or other LSI's (Large Scale Integrations), and in software by a program loaded in main memory, etc. Therefore, it will be obvious to those skilled in the art that the functional blocks may be implemented in a variety of manners by a combination of hardware and software.

Figure 6:
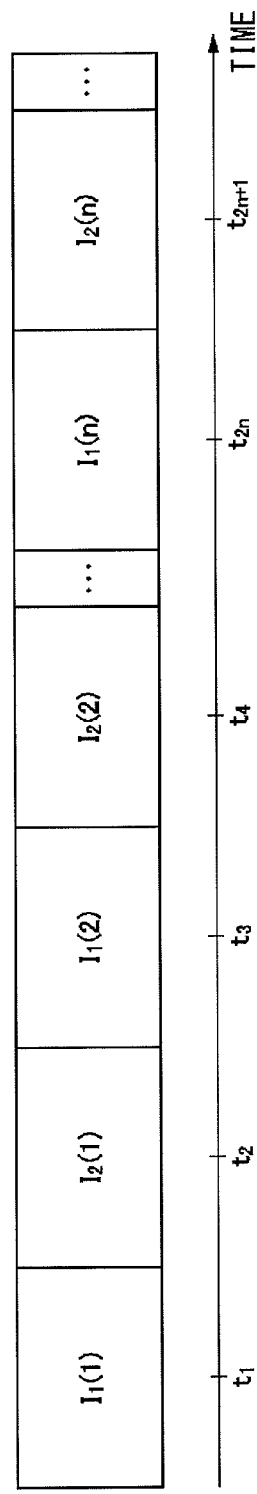
FIG. 6 is a diagram illustrating, in chronological order, video images stored in an image buffer when two users view different video images while sharing television.

FIG. 6 is a diagram illustrating, in chronological order, video images stored in the image buffer 80 when two users 216a and 216b view different video images $I_1$ and $I_2$ while sharing the television 206. At time $t_1$, a video image $I_1(1)$ is stored in the image buffer 80. The video image $I_1(1)$ is the first frame of the video images $I_1$. At time $t_2$ taken after a predetermined interval of t seconds, a video images $I_2(1)$ is stored. The video image $I_2(1)$ is the first frame of the video images $I_2$. At time $t_2$ taken t seconds after the time $t_2$, a video image $I_1(2)$ is stored in the image buffer 80. The video image $I_1(2)$ is the second frame of the video images $I_1$. As described, the two different video images $I_1$ and $I_2$ are alternately stored in a time-division manner in the image buffer 80. As a result, the two different video images $I_1$ and $I_2$ are alternately displayed in a time-division manner on the television 206 serving as the display unit. A video image $I_1(n)$ represents an nth frame of the video image $I_1$. If a frame order is not to be specified, a video image is simply denoted as $I_1$. The same applies to the case of the video image $I_2$.

Figure 7:
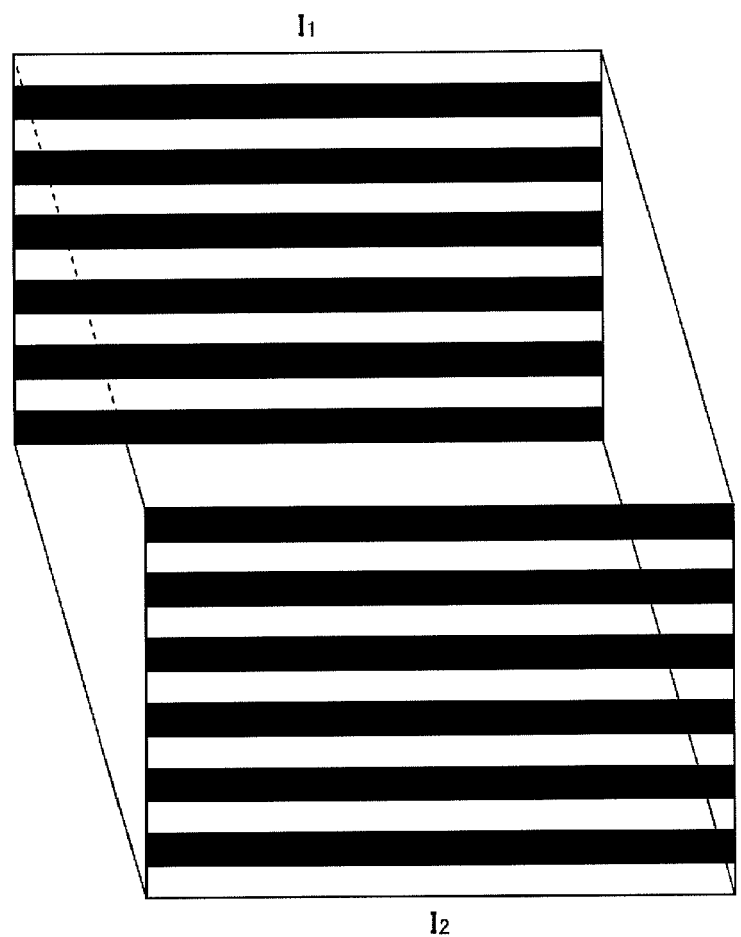
FIG. 7 is a diagram schematically illustrating an example of a mask pattern selected by a replacing mask determination unit according to the embodiment.

FIG. 7 is a diagram schematically illustrating an example of a mask pattern selected by the replacing mask determination unit 60 according to the embodiment. As described above, the replacing mask determination unit 60 selects a mask pattern every time the video-image selection unit 20 acquires a video image. FIG. 7 illustrates an example of a mask pattern for masking pixels, which compose a video image, alternately in a grid-like pattern in the horizontal direction. The replacing mask determination unit 60 selects a mask pattern for replacing an even-numbered horizontal line with a single color line as a mask pattern for the video image $I_1$ and selects a mask pattern for replacing an odd-numbered horizontal line with a single color line as a mask pattern for the video image $I_2$.

The user 216a viewing the video image $I_1$ will view the video image $I_1$ whose vertical-direction resolution and brightness are half compared to those of the original video image $I_1$. Since the pixels composing the video image $I_1$ and the pixels composing the video image $I_2$ are different when displayed on the television 206, the video images are prevented from getting mixed with each other. Thus, crosstalk can be reduced. The same applies to the user 216b viewing the video image $I_2$.

In the example shown in FIG. 7, an explanation is given regarding the case where the crosstalk is reduced by decreasing the resolution of a video image in the vertical direction. Depending on the type of a video image, there exists a video image whose resolution in the vertical direction tends to be lower than that in the horizontal direction.

Figure 8:
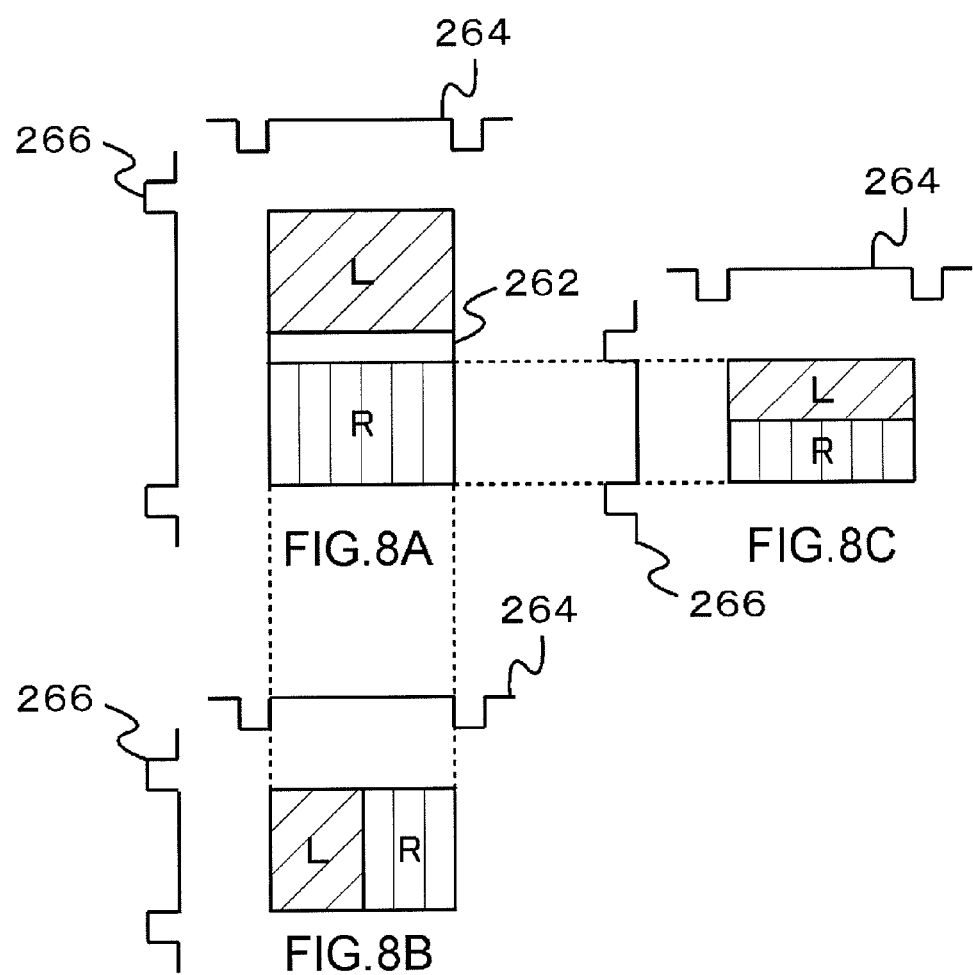

FIGS. 8A-8C are diagrams illustrating a group of format standards related to three-dimensional video images in HDMI (High-Definition Multimedia Interface) v1.4a.

FIG. 8A is a diagram illustrating a frame packing format. A frame packing format is a format for transmitting a full-size left-eye parallax image L and a full-size right-eye parallax image R as a single frame. More specifically, the right-eye parallax image R is arranged below the left-eye parallax image L with a blank portion 262 in between. Therefore, a horizontal synchronization signal 264 used at the time of drawing is the same as that used when drawing a single parallax image. However, the length of a vertical synchronization signal 266 becomes a total length of the two parallax images and the blank portion 262.

FIG. 8B is a diagram illustrating a side-by-side format. A side-by-side format is a format for reducing the left-eye parallax image L and the right-eye parallax image R such that the respective widths thereof become half in the horizontal direction and for combining the reduced parallax images such that the size of the combined images becomes the size of a single full-size image for transmission. A signal indicating that the format is a side-by-side format is transmitted as a part of an HDMI control signal.

FIG. 8C is a diagram illustrating a top-and-bottom format. A top-and-bottom format is a format for reducing the left-eye parallax image L and the right-eye parallax image R such that the respective widths thereof become half in the vertical direction and then combining the reduced parallax images such that the size of the combined images becomes the size of a single full-size image for transmission. A signal indicating that the format is a top-and-bottom format is transmitted as a part of the HDMI control signal.

In the format of a top-and-bottom method shown in FIG. 8C, the resolution of the left-eye parallax image L and the resolution of the right-eye parallax image R in the vertical direction both become half of the original resolution. If crosstalk is reduced by the mask patterns shown in FIG. 7 when viewing a video image recorded in the format of a top-and-bottom method, the resolution in the vertical direction becomes further decreased, and a feeling of strangeness can possibly be provided. In viewing a video image whose resolution in the vertical direction is lower than that in the horizontal direction as shown in the example shown in FIG. 8C, a mask pattern that is different from those shown in FIG. 7 is preferably used.

Figure 9:
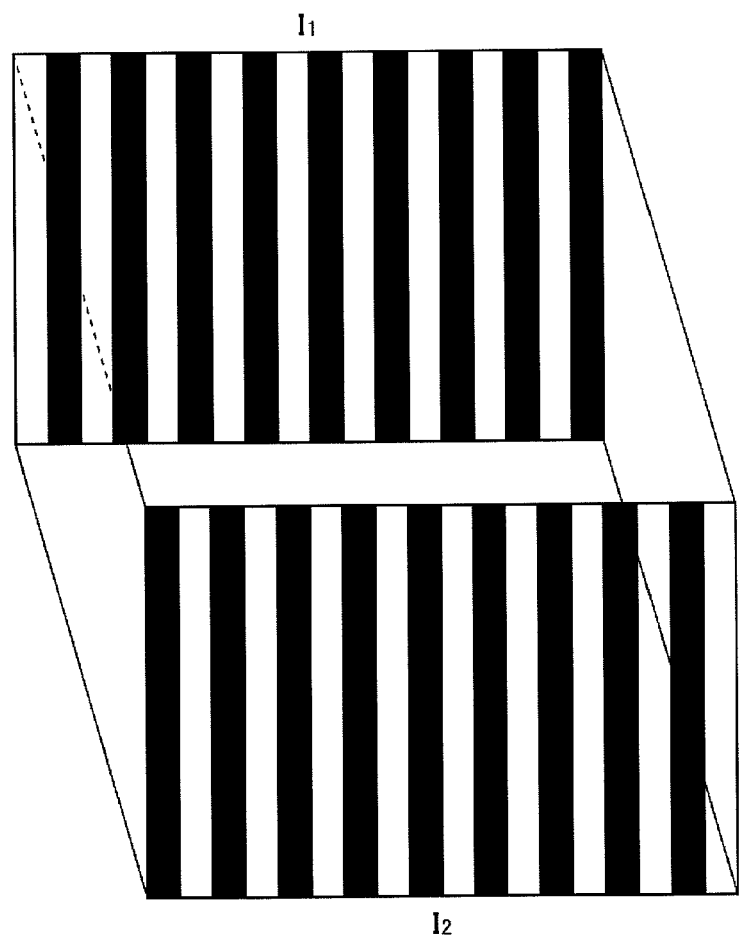
FIG. 9 is a diagram schematically illustrating another example of a mask pattern selected by the replacing mask determination unit according to the embodiment.

FIG. 9 is a diagram schematically illustrating another example of a mask pattern selected by the replacing mask determination unit 60 according to the embodiment. FIG. 9 illustrates an example of a mask pattern for masking pixels, which compose a video image, alternately in a grid-like pattern in the vertical direction. The replacing mask determination unit 60 selects a mask pattern for replacing even-numbered vertical lines with single color lines as a mask pattern for the video image $I_1$ and selects a mask pattern for replacing odd-numbered vertical lines with single color lines as a mask pattern for the video image $I_2$.

The user 216a viewing the video image $I_1$ masked by mask patterns shown in FIG. 9 will view the video image $I_1$ whose resolution in the horizontal direction and brightness are half compared to those of the original video image $I_1$. Since the pixels composing the video image $I_1$ and the pixels composing the video image $I_2$ are different when displayed on the television 206, the video images are prevented from getting mixed with each other. Thus, crosstalk can be reduced. The same applies to the user 216b viewing the video image $I_2$. The application of the mask patterns shown in FIG. 9 when viewing a video image whose resolution in the vertical direction is lower than that in the horizontal direction, as shown in the example shown in FIG. 8C, allows the resolution in the vertical direction and the resolution in the horizontal direction to become closer to each other's values. Thus, a sense of incongruity provided to the viewer can be reduced.

As described, the replacing mask determination unit 60 according to the embodiment acquires a result of analyzing a video image by the video-image analysis unit 40. If the resolution of the video image in the vertical direction is higher than that in the horizontal direction, the replacing mask determination unit 60 selects a mask pattern that has a periodicity in the vertical direction of the video image. If the resolution of the acquired video image in the vertical direction is lower than that in the horizontal direction, the replacing mask determination unit 60 selects a mask pattern that has a periodicity in the horizontal direction of the video image. This allows for a reduction in a sense of incongruity caused by the gap between the resolution in the vertical direction and the resolution in the horizontal direction that is provided to the viewer.

Figure 10:
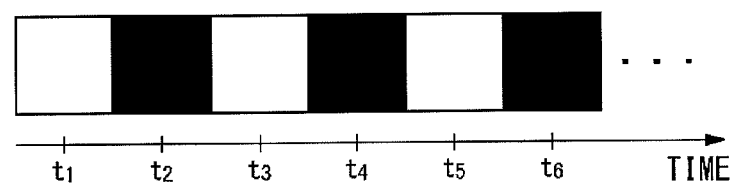
FIG. 10 is a diagram illustrating how a pixel of a single color emerges at a pixel at an arbitrary position of a mask pattern.

In the mask patterns shown in FIGS. 7 and 9, masking by the replacement with pixels of a single color and non-masking are alternately performed in chronological order for pixels at an arbitrary position. FIG. 10 is a diagram illustrating how pixels of a single color emerge in pixels at an arbitrary position. As shown in FIG. 10, the replacing mask determination unit 60 according to the embodiment selects a mask pattern so that crosstalk is reduced in a black insertion method on a pixel-by-pixel basis. If masking by the replacement with pixels of a single color and non-masking are alternately performed in chronological order, the user 216 observes a mixture of a video image and the pixels of a single color. However, for example, if the pixels of a single color are gray pixels, the video image mixed with the pixel is viewed to be darker. Thus, a situation can be prevented where video images having different structures are observed while being mixed with one another.

Meanwhile, it makes no sense if a video image displayed on the television 206 fails to be a valid video image as a result of reducing the crosstalk. For example, it is assumed that a mask pattern is employed for the video image $I_1$ for masking the left half of the video image and that a mask pattern is employed for the video image $I_2$ for masking the right half of the video image. As in the case of the mask patterns shown in FIGS. 7 and 9, a reduction in crosstalk in a black insertion method can be also reduced in this case on a pixel-by-pixel basis. However, only the right half of the video image $I_1$ and only the left half of the video image I₂ will be displayed on the television 206. Thus, the video images fail to be valid video images.

In order to prevent such a situation, a mask pattern needs to be employed that replaces some pixels composing the video image with pixels of a single color such that said some pixels are spatially removed. This is because the entire structure of a video image can be viewed as long as pixels composing the video image are spatially dispersed. An area of the video image in which many pixels are replaced with pixels of a single color is observed as an area with low brightness by the user viewing the video image. Therefore, a mask pattern desirably has a periodicity to evenly thin out the entire video image. For example, the mask patterns shown in FIG. 7 are mask patterns that allow pixels, which are to be replaced, to periodically appear in the vertical direction. The mask patterns shown in FIG. 9 are mask patterns that allow pixels, which are to be replaced, to periodically appear in the horizontal direction.

Figure 11:
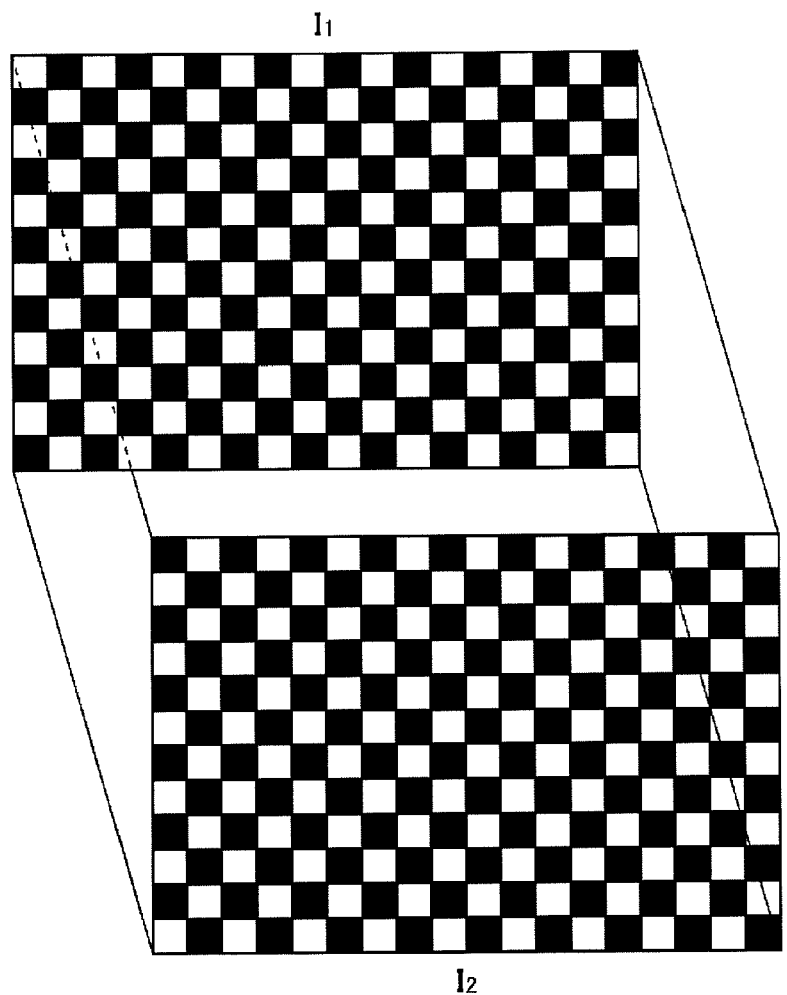
FIG. 11 is a diagram schematically illustrating yet another example of a mask pattern selected by the replacing mask determination unit according to the embodiment.

FIG. 11 is a diagram schematically illustrating yet another example of a mask pattern selected by the replacing mask determination unit 60 according to the embodiment. An example shown in FIG. 11 shows checkered mask patterns that allow pixels, which are to be replaced, to periodically appear in both vertical and horizontal directions.

Explained above is a situation where two users 216*a* and 216*b* view different video images I₁ and I₂ while sharing the television 206. Hereinafter, an explanation is given of a mask pattern used when the number of users further increases.

FIGS. 12A-12B are diagrams each showing an example of a mask pattern when displaying three video images while sharing the television 206. FIG. 12A shows mask patterns that are the same as those shown in FIG. 7. Areas that are not replaced with pixels of a single color are displayed being alternately assigned with three video images A, B, and C in chronological order. In a method shown in FIG. 12A, even when the number of video images sharing the television 206 increases, a rate of decrease in the resolution of each video image is the same as that obtained when the television 206 is shared by two video images.

FIG. 12B shows mask patterns each pixel displaying a video image displays only one of three video images A, B, and C. In other words, this is a method for assigning the resolution of a video image to each of three video images A, B, and C for display. Although the resolution of each video image decreases as the number of video images sharing the television 206 increases, an ability of reducing crosstalk is better than that in the method shown in FIG. 12A since each pixel displays only any one of the video images.

In summary, when selecting a mask pattern for a certain video image, if the replacing mask determination unit 60 according to the embodiment selects a mask pattern that is different from a mask pattern used for the last video image, the mask pattern being different in the position of pixels not to be replaced with pixels of a single color, crosstalk in the video image can be reduced. In the mask pattern for a certain image, all the positions of pixels not to be replaced with pixels of a single color are preferably different from those of the mask pattern used for the last video image. However, pixels may be included that are not to be replaced with pixels of a single color but have the same positions as those of the mask pattern used for the last video image. This may be determined through experiments such that crosstalk can be substantially reduced in consideration of the type of a video image to be displayed, a desired degree of reduction in crosstalk, a decrease in a brightness value, the number of video images sharing, and the like.

Figure 13:
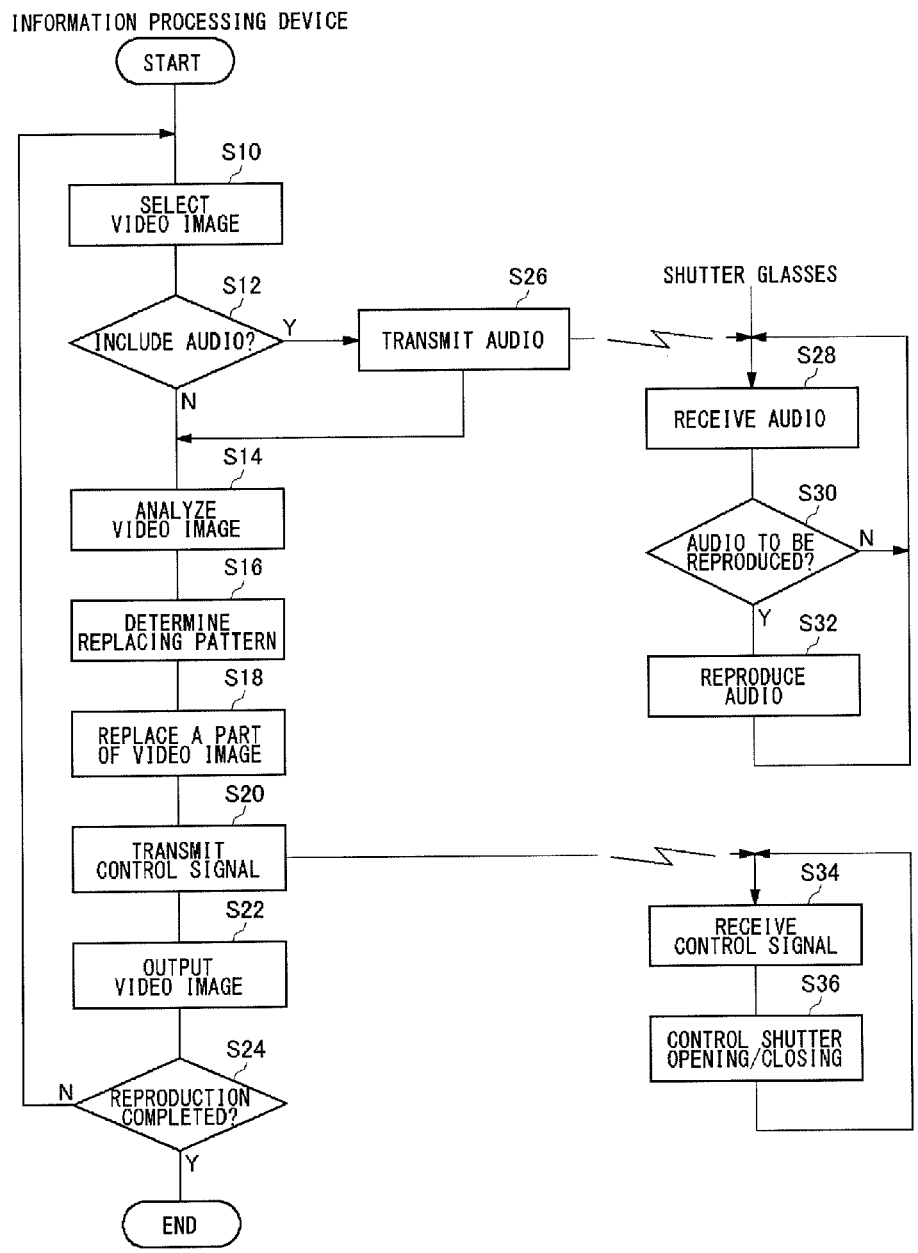
FIG. 13 is a flowchart illustrating a processing procedure in the information processing device according to the embodiment.

FIG. 13 is a flowchart illustrating a processing procedure in the information processing device 100 according to the embodiment. Processes in the flowchart are started, for example, when the power of the information processing device 100 is turned on.

The video-image selection unit 20 selects a video image acquired from the video-image reproduction unit 10 (S10). If the video image acquired by the video-image selection unit 20 includes audio information (Y in S12), the audio-signal transmitter unit 34 transmits the audio information to the shutter glasses 210 (S26).

The shutter glasses 210 receive the audio information transmitted from the audio-signal transmitter unit 34 (S28). If the received audio information corresponds to a video image being viewed by a user 216 wearing the shutter glasses 210 and is to be reproduced (Y in S30), the received audio information is reproduced using an earphone accompanied with the shutter glasses 210 (S32). If the received audio information does not correspond to the video image being viewed by the user 216 wearing the shutter glasses 210 and is not to be reproduced (N in S30), the shutter glasses 210 do not reproduce the audio information.

After the audio-signal transmitter unit 34 transmits the audio information to the shutter glasses 210 or if the acquired video image does not include audio information (N in S12), the video-image analysis unit 40 analyzes a video image selected by the video-image selection unit 20 (S14). The replacing mask determination unit 60 determines a mask pattern for replacing the video image based on a result of analysis performed by the video-image analysis unit 40 (S16).

In accordance with a mask pattern determined by the replacing mask determination unit 60, the video-image replacing unit 70 masks the video image selected by the video-image selection unit 20 by replacing some pixels composing the video image with pixels of a single color (S18). The control-signal transmitter unit 32 transmits a control signal, which is used by the shutter glasses 210 to control the shutter opening/closing, to the shutter glasses 210 based on the result of the analysis performed by the video-image analysis unit 40 (S20).

The shutter glasses 210 receive the control signal transmitted from the control-signal transmitter unit 32 (S34). The shutter glasses 210 control the shutter opening/closing in accordance with the received control signal (S36).

The video-image output unit 50 outputs to the television 206 the video image for which the replacement was performed by the video-image replacing unit 70 and which is stored in the image buffer 80 (S22). While the video-image reproduction unit 10 continues to reproduce the video image (N in S24), the step moves back to the step S10 so as to continue the above-stated processes. Upon completion of the reproduction of the video image by the video-image reproduction unit 10 (Y in S24), the processes in the flowchart are ended.

The operation of the above configuration is shown in the following. When the user 216 reproduces a plurality of different video images with use of the information processing device 100 according to the embodiment, the replacing mask determination unit 60 determines a mask pattern for reducing crosstalk based on a result of analysis performed by the video-image analysis unit 40. The video-image replacing unit 70 reduces the crosstalk in a black insertion method in units of pixels composing the video image in accordance with the mask pattern, and the control-signal transmitter unit 32 transmits the control signal, which is used by the shutter glasses 210 to control the shutter opening/closing, to the shutter glasses 210 worn by the user 216.

As described above, the information processing device 100 according to the embodiment can provide a technology for reducing crosstalk that can be produced in television.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

Exemplary Variation of Embodiment

Figure 14:
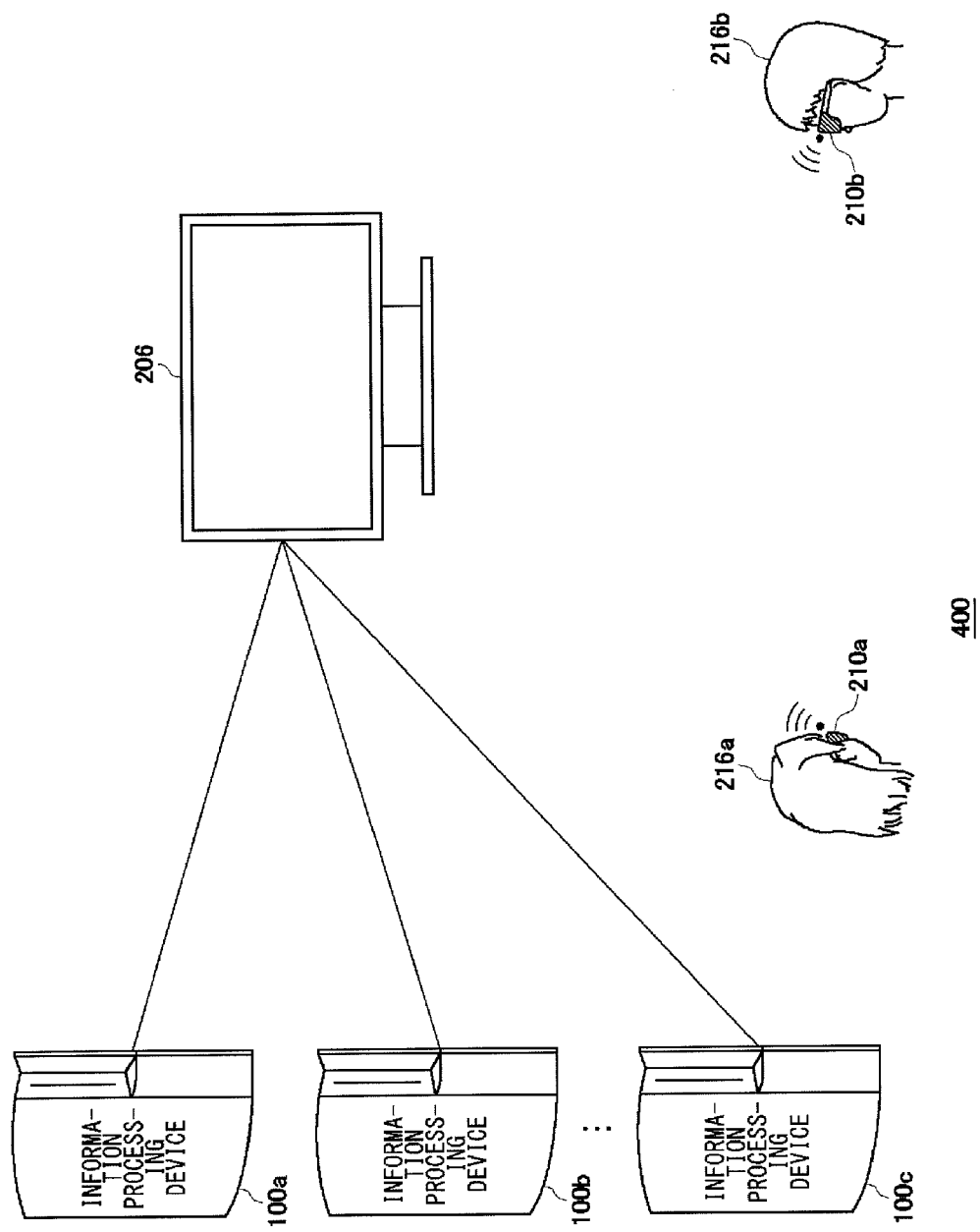
FIG. 14 is a diagram schematically illustrating another configuration of a device used in the screen sharing system according to the embodiment.

FIG. 14 is a diagram schematically illustrating another configuration of a device used in the screen sharing system 400 according to the embodiment. In the screen sharing system 400 according to the exemplary variation, a plurality of information processing devices 100, as shown as an information processing device 100a, an information processing device 100b, and an information processing device 100c, are connected to a television 206. In other words, a configuration where a plurality of video-image reproduction units 10 are connected to the television 206 is being employed.

In this case, the television 206 may comprise a video-image selection unit 20, a transmitter unit 30, a video-image analysis unit 40, a video-image output unit 50, a replacing mask determination unit 60, a video-image replacing unit 70, and an image buffer 80 so as to reduce the above-stated crosstalk.

What is claimed is:

1. An information processing method comprising:
making a video-image selection for cyclically acquiring at least two types of video images;
making a mask determination for selecting, for each acquired video image, a mask pattern for masking the acquired video image by replacing some pixels composing the acquired video image with pixels of a single color such that said some pixels are spatially removed; and
displaying on a display unit the video image after replacing said some pixels composing the video image with pixels of a single color based on the selected mask pattern,
wherein, in the mask determination, when selecting a mask pattern for a certain video image, a mask pattern is selected that is different from a mask pattern used for the last video image, the mask pattern being different in the position of pixels not to be replaced with pixels of a single color,
wherein in the mask determination, a mask pattern is determined based on the resolution of the acquired video image, and
wherein in the mask determination, if the resolution of the acquired video image in the vertical direction is higher than that in the horizontal direction, a mask pattern that has a periodicity in the vertical direction of the video image is selected, and if the resolution of the acquired video image in the vertical direction is lower than that in the horizontal direction, a mask pattern that has a periodicity in the horizontal direction of the video image is selected.

2. The information processing method according to claim 1, further comprising: transmitting to shutter glasses a control signal used to control the shutter opening/closing of the shutter glasses used for observing the display unit.

3. The information processing method according to claim 2,
wherein the shutter glasses determine the type of a video image being displayed on the display unit based on the control signal and open a shutter of the shutter glasses when any one of the video images is being displayed on the display unit, and
wherein the information processing method further comprises transmitting to an audio output unit provided in the shutter glasses, if the video image includes audio information, the audio information corresponding to the video image being displayed on the display unit when the shutter glasses open the shutter.

4. The information processing method according to claim 2, wherein if the video image is a stereoscopic video image including a left-eye parallax image and a right-eye parallax image, the shutter glasses further determine whether the video image being displayed on the display unit is the left-eye parallax image or the right-eye parallax image based on the control signal, wherein when the video image being displayed on the display unit is the left-eye parallax image, the shutter glasses open a left-eye shutter and close a right-eye shutter of the shutter glasses, and wherein when the video image being displayed on the display unit is the right-eye parallax image, the shutter glasses open the right-eye shutter and close the left-eye shutter of the shutter glasses.

5. The information processing method according to claim 1, wherein the pixels of a single color are gray pixels of a predetermined brightness value or less.

6. An information processing device comprising:
a video-image selection unit configured to cyclically acquire at least two types of video images;
a replacing mask determination unit configured to select, for each acquired video image, a mask pattern for masking the video image acquired by the video-image selection unit by replacing some pixels composing the acquired video image with pixels of a single color such that said some pixels are spatially removed;
a video-image replacing unit configured to replace said some pixels composing the video image acquired by the video-image selection unit with the pixels of a single color based on the mask pattern selected by the replacing mask determination unit and to output the video image to an image buffer, and
an output unit configured to output the video image for which the replacement was performed by the video-image replacing unit,
wherein the replacing mask determination unit selects, when selecting a mask pattern for a certain video image, a mask pattern that is different from a mask pattern used for the last video image, the mask pattern being different in the position of pixels not to be replaced with pixels of a single color,
wherein the replacing mask determination unit determines a mask pattern based on the resolution of the acquired video image, and
wherein the replacing mask determination unit, if the resolution of the acquired video image in the vertical direction is higher than that in the horizontal direction, selects a mask pattern that has a periodicity in the vertical direction of the video image, and if the resolution of the acquired video image in the vertical direction is lower than that in the horizontal direction, selects a mask pattern that has a periodicity in the horizontal direction of the video image.

7. A computer program embedded on a non-transitory computer-readable recording medium, comprising:
- a module configured to make a video-image selection for cyclically acquiring at least two types of video images;
- a module configured to make a mask determination for selecting, for each acquired video image, a mask pattern for masking the acquired video image by replacing some pixels composing the acquired video image with pixels of a single color such that said some pixels are spatially removed; and
- a module configured to display on a display unit the video image after replacing said some pixels composing the video image with the pixels of a single color based on the selected mask pattern,
- wherein, in the module configured to make a mask determination, when selecting a mask pattern for a certain video image, a mask pattern is selected that is different from a mask pattern used for the last video image, the mask pattern being different in the position of pixels not to be replaced with pixels of a single color,
- wherein the module configured to make a video-image selection determines a mask pattern based on the resolution of the acquired video image, and
- wherein the module configured to make a video-image selection, if the resolution of the acquired video image in the vertical direction is higher than that in the horizontal direction, selects a mask pattern that has a periodicity in the vertical direction of the video image, and if the resolution of the acquired video image in the vertical direction is lower than that in the horizontal direction, selects a mask pattern that has a periodicity in the horizontal direction of the video image.

* * * * *